(12) United States Patent
Caldwell et al.

(10) Patent No.: US 8,145,190 B2
(45) Date of Patent: Mar. 27, 2012

(54) SYSTEM AND METHOD FOR BILLING IP-BASED WIRELESS TELECOMMUNICATIONS IN A CONVERGED NETWORK

(75) Inventors: Christopher E. Caldwell, Woodstock, GA (US); Janne P. Linkola, Espoo (FI)

(73) Assignee: T-Mobile USA, Inc., Bellevue, WA (US)

( * ) Notice: Subject to any disclaimer, the term of this patent is extended or adjusted under 35 U.S.C. 154(b) by 654 days.

(21) Appl. No.: 12/089,901

(22) PCT Filed: Oct. 11, 2006

(86) PCT No.: PCT/US2006/039688
§ 371 (c)(1),
(2), (4) Date: Feb. 11, 2009

(87) PCT Pub. No.: WO2007/047292
PCT Pub. Date: Apr. 26, 2007

(65) Prior Publication Data
US 2009/0215429 A1    Aug. 27, 2009

Related U.S. Application Data

(60) Provisional application No. 60/726,105, filed on Oct. 12, 2005.

(51) Int. Cl.
*H04M 11/00* (2006.01)
(52) U.S. Cl. ........................................ 455/406; 455/423
(58) Field of Classification Search .................. 370/329, 370/401; 455/406–410, 436, 423; 379/111
See application file for complete search history.

(56) References Cited

U.S. PATENT DOCUMENTS

| 5,937,044 A * | 8/1999 | Kim ........................ 379/121.05 |
| 5,956,024 A | 9/1999 | Strickland et al. |
| 6,704,412 B1 | 3/2004 | Harris et al. |

(Continued)

FOREIGN PATENT DOCUMENTS

WO    WO-2005079087 A1    8/2005

(Continued)

OTHER PUBLICATIONS

International Search Report and Written Opinion, International Application No. PCT/US2006/41225, Filed on Oct. 20, 2006, Applicant: T-Mobile USA, Inc., Date of Mailing Mar. 19, 2008, 10 pages.

*Primary Examiner* — Kent Chang
*Assistant Examiner* — Kashif Siddiqui
(74) *Attorney, Agent, or Firm* — Perkins Coie LLP

(57) ABSTRACT

A system and method for collaborating with a billing system is provided for use in a converged telecommunication network that includes a cellular telephone network and an IP-based network. During an IP-based call registration process, a mobile device communicates with a network controller over the IP-based network. The network controller accesses a database with the information provided by the mobile device and subsequently overloads values for an existing field in a call detail record (CDR). Upon completion of the call over the IP-based network, the network controller communicates the overloaded version of the CDR to an MSC which generates the final CDR that is used for billing. Any appropriate field of the CDR can be selected for overloading, such as for example an existing CGI record field from the CDR.

36 Claims, 7 Drawing Sheets

U.S. PATENT DOCUMENTS

| | | |
|---|---|---|
| 6,781,959 B1 | 8/2004 | Garakani et al. |
| 6,785,535 B2 | 8/2004 | Lucidarme et al. |
| 7,012,888 B2 | 3/2006 | Schoeneberger et al. |
| 7,079,850 B2 | 7/2006 | Cameron et al. |
| 7,768,983 B2 | 8/2010 | Nylander et al. |
| 2001/0036224 A1 | 11/2001 | Demello et al. |
| 2001/0048713 A1 | 12/2001 | Medlock et al. |
| 2001/0048714 A1 | 12/2001 | Jha |
| 2002/0013797 A1 | 1/2002 | Jha et al. |
| 2002/0018518 A1 | 2/2002 | Subramanian et al. |
| 2002/0031166 A1 | 3/2002 | Subramanian et al. |
| 2002/0062472 A1 | 5/2002 | Medlock et al. |
| 2003/0081580 A1 | 5/2003 | Vaidyanathan et al. |
| 2003/0109265 A1 | 6/2003 | Yamamoto et al. |
| 2004/0014423 A1 | 1/2004 | Croome et al. |
| 2004/0077331 A1 | 4/2004 | King |
| 2004/0192211 A1 * | 9/2004 | Gallagher et al. ............ 455/423 |
| 2004/0233930 A1 | 11/2004 | Colby |
| 2005/0170818 A1 | 8/2005 | Netanel et al. |
| 2005/0181805 A1 | 8/2005 | Gallagher |
| 2005/0186948 A1 | 8/2005 | Gallagher et al. |
| 2005/0233733 A1 | 10/2005 | Roundtree et al. |
| 2005/0239441 A1 | 10/2005 | Eronen |
| 2005/0255879 A1 | 11/2005 | Shi et al. |
| 2005/0265279 A1 | 12/2005 | Markovic et al. |
| 2005/0266853 A1 | 12/2005 | Gallagher et al. |
| 2005/0271008 A1 | 12/2005 | Gallagher et al. |
| 2005/0272424 A1 | 12/2005 | Gallagher et al. |
| 2005/0272449 A1 | 12/2005 | Gallagher et al. |
| 2005/0282534 A1 | 12/2005 | Subramanian et al. |
| 2005/0286466 A1 * | 12/2005 | Tagg et al. .................... 370/329 |
| 2006/0003757 A1 | 1/2006 | Subramanian et al. |
| 2006/0035646 A1 | 2/2006 | Fox et al. |
| 2006/0045057 A1 | 3/2006 | Nylander et al. |
| 2006/0045069 A1 | 3/2006 | Zehavi et al. |
| 2006/0052113 A1 * | 3/2006 | Ophir et al. ................ 455/456.1 |
| 2006/0058020 A1 | 3/2006 | Fox et al. |
| 2006/0058021 A1 | 3/2006 | Fox et al. |
| 2006/0062225 A1 | 3/2006 | Li |
| 2006/0068784 A1 | 3/2006 | Fox et al. |
| 2006/0079228 A1 | 4/2006 | Marsico et al. |
| 2006/0099935 A1 | 5/2006 | Gallagher et al. |
| 2006/0223497 A1 * | 10/2006 | Gallagher et al. ............ 455/410 |
| 2006/0268902 A1 | 11/2006 | Bonner |
| 2006/0274703 A1 | 12/2006 | Connelly |
| 2008/0096504 A1 | 4/2008 | Linkola et al. |
| 2010/0048165 A1 | 2/2010 | Caldwell et al. |

FOREIGN PATENT DOCUMENTS

WO     WO 2005079087 A1 *    8/2005

* cited by examiner

SYSTEM AND METHOD FOR BILLING IP-BASED WIRELESS TELECOMMUNICATIONS IN A CONVERGED NETWORK

RELATED APPLICATIONS

This utility patent application is a U.S. National Stage application of International Application No. PCT/US06/39688, entitled "SYSTEM AND METHOD FOR BILLING IP-BASED WIRELESS TELECOMMUNICATIONS IN A CONVERGED NETWORK," filed Oct. 11, 2006, which claims the benefit under 35 United States Code §119(e) of U.S. Provisional Patent Application No. 60/726,105, which was filed Oct. 12, 2005.

FIELD OF THE INVENTION

The present invention relates to billing systems in converged telecommunication networks. More specifically, the present invention is related to billing systems and methods of embedding billing related information in call detail record fields.

BACKGROUND

A variety of technologies enable telecommunication services to be offered using Internet Protocol (IP). Commonly referred to as Voice over IP, or VoIP, such technologies enable telecommunications on any public or private IP network, including the Internet. VoIP technology permits a user to receive IP-based telecommunications services through a variety of devices, including a desktop computer, a notebook computer, an analog handset used in conjunction with a VoIP telephone adapter, a VoIP-enabled handset, or other like device.

Increasingly, mobile devices, such as notebook computers, personal digital assistants (PDAs), wireless handhelds, wireless handsets, or other similar devices, are also being enabled to receive IP-based telecommunications services. Such services are provided by enabling the mobile device to communicate with a wireless router and access any IP-based wireless access network, such as a network based on the IEEE 802.16 (WiMAX), IEEE 802.20 Mobile Broadband Wireless Access (MBWA), Ultra Wideband (UWB), 802.11 wireless fidelity (Wi-Fi), and Bluetooth standards.

Moreover, dual-mode mobile telecommunications devices may be enabled to communicate with any IP-based wireless access network. For instance, Unlicensed Mobile Access (UMA) technology allows wireless service providers to merge cellular networks, such as Global System for Mobile Communications (GSM) networks, and IP-based wireless networks into one seamless service with one mobile device, one user interface, and a common set of network services for both voice and data. UMA technology has recently been accepted into release 6 of the 3rd Generation Partnership Project (3GPP) standard as a General Access Network (GAN). With UMA or GAN solutions, subscribers may move between cellular networks and IP-based wireless networks with seamless voice and data session continuity as transparently as they move between cells within the cellular network. Seamless in-call handover between the IP-based wireless network and cellular network ensures that the user's location and mobility do not affect the services delivered to the user. Services may be identical whether connected over the IP-based wireless network or the cellular network. UMA technology effectively creates a parallel radio access network, the UMA network, which interfaces to the mobile core network using standard mobility-enabled interfaces. The mobile core network remains unchanged. The common mobile core network makes it possible for the service provider to have full service and operational transparency. The existing service provider Business Support Systems (BSS), service delivery systems, content services, regulatory compliance systems, and Operation Support Systems (OSS) can support the UMA network without change. Service enhancements and technology evolution of the mobile core network apply transparently to both cellular access and UMA.

The present disclosure has identified a number of problems in billing systems for converged networks such as UMA. Although the convergence of cellular and IP-based wireless telecommunications technologies offer substantial benefits to users, cellular service providers face many obstacles in implementing the IP-based component of converged product and service offerings. Service providers must implement new methods and systems, or adapt methods and systems currently implemented for the cellular component of their networks, of rating and billing of users' wireless communications. Cellular service providers' billing systems are arranged to interpret and scale for cellular-based call detail records. As such, cellular service providers are ill equipped to handle billing based on access points and broadband Internet networks.

BRIEF DESCRIPTION OF THE DRAWINGS

Non-limiting and non-exhaustive embodiments are described with reference to the following drawings.

DETAILED DESCRIPTION

Figure 1A:
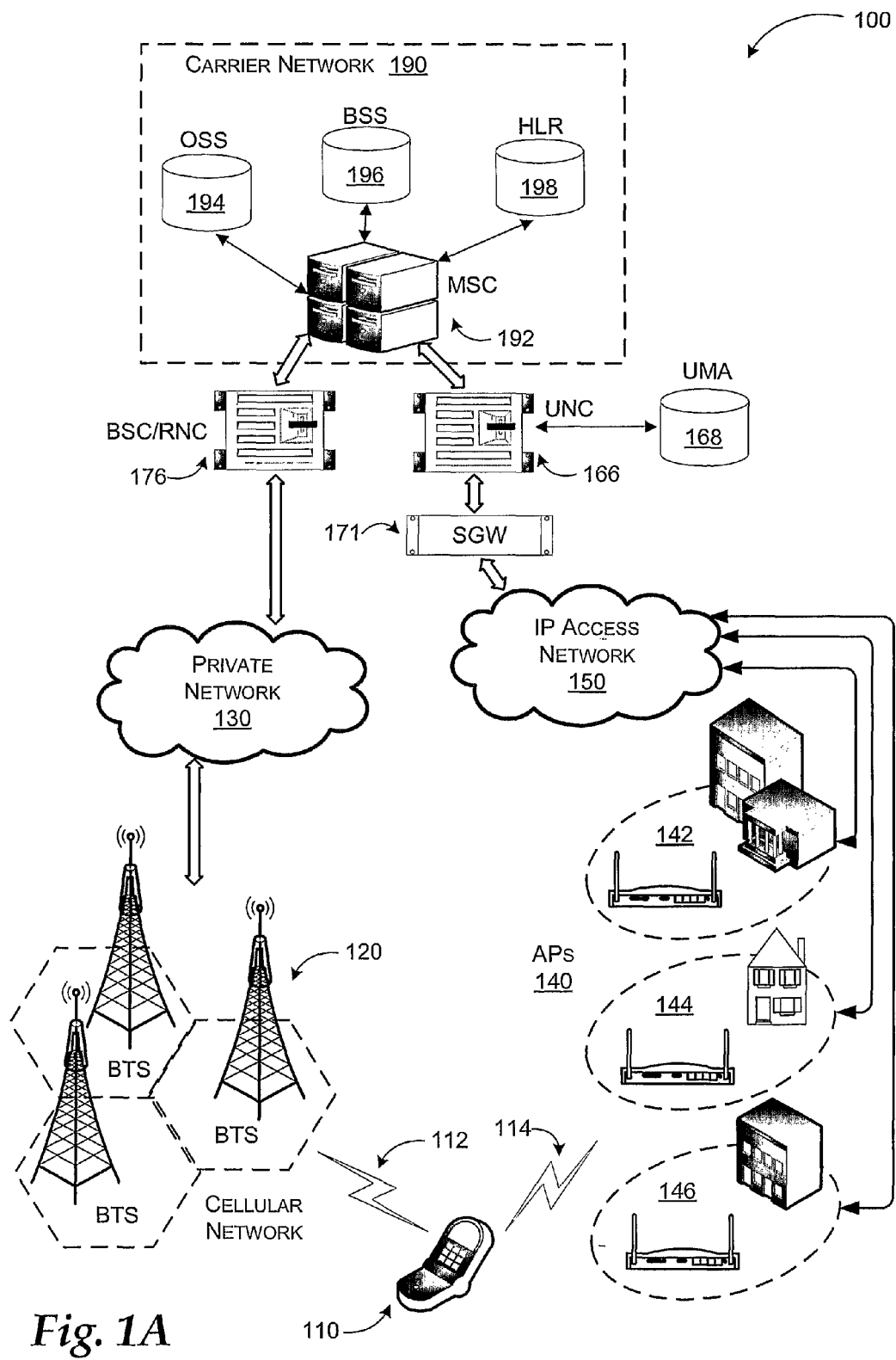
FIG. 1A illustrates example converged wireless networks combining a cellular network with an IP-based access network (in this case, a UMA network).

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Briefly stated, the present disclosure relates to a system and method for collaborating with a billing system for use in a converged telecommunication network that includes a cellular telephone network and an IP-based network. During an IP-based call registration process, a mobile device communicates with a network controller over the IP-based network. The network controller accesses a database with the information provided by the mobile device and subsequently overloads values for an existing field in a call detail record (CDR). Upon completion of the call over the IP-based network, the network controller communicates the overloaded version of the CDR to an MSC which generates the final CDR that is used for billing. Any appropriate field of the CDR can be selected for overloading, such as for example an existing CGI record field from the CDR.

Converged Cellular and IP-Based Wireless Telecommunications Networks

In a converged wireless network, a cellular carrier, such as a GSM or CDMA carrier, may additionally offer wireless telecommunications services over an alternate IP-based wireless telecommunications network, such as the Internet. For instance, Unlicensed Mobile Access (UMA) technology allows cellular service providers to offer their products and services seamlessly over Internet-connected broadband networks. Dual-mode mobile devices may utilize licensed spectrums (such as spectrums for cellular communications) and alternate licensed and unlicensed spectrums (such as spectrums that may be used for IP-based communication). For example, dual-mode cellular phones may access a cellular network, such as a GSM network, or an IP-based wireless network, such as a network based on the IEEE 802.16 (WiMAX), IEEE 802.20 Mobile Broadband Wireless Access (MBWA), Ultra Wideband (UWB), 802.11 wireless fidelity (Wi-Fi), or Bluetooth standards. The IP-based networks may also be accessed via wireless access points that are typically connected to a DSL (Digital Subscriber Line) modem, a cable modem, a satellite modem, or any other broadband Internet connection. Access points may be public or private, and may be located in a subscriber's home, in public locations such as coffee shops, libraries, or schools, or in corporate locations.

When a dual mode mobile device accesses an IP-based wireless network, information is formatted in its native protocol, such as CDMA or GSM system protocols, and then encapsulated into Internet Protocol (IP) packets, transmitted to the access point, and communicated over the Internet to the cellular service provider's mobile core network. Such transmission bypasses the service provider's existing network of radio towers. Because the same native protocols are used in communications involving IP access points as with traditional radio towers, the cellular service provider maintains a large degree of system compatibility even though using an IP-based network. The systems of the cellular service provider that deliver content and handle mobility may not even need to be aware that a subscriber's mobile device is on an alternate wireless network. The system may instead assume the mobile device is on its native cellular network. The IP network is therefore abstracted with respect to the cellular network, regardless of whether the mobile device connects to the cellular network via a base station (for licensed spectrum access) or a wireless access point (for licensed, semilicensed or unlicensed spectrum access).

A non-exhaustive list of products and services available on IP-based wireless networks includes not only voice services, but also supplementary services like call forwarding and call waiting, text messaging services like SMS, and data-based services like ringtone downloads, game downloads, picture messaging, email and web browsing. Further, since a dual-mode mobile device is connected to an IP network, all manner of data services available over such networks may be provided to the mobile device.

FIG. 1A is an illustration of a system 100 that combines a cellular telephone network with an IP-based wireless network, in this case a UMA network. The described system 100 accepts registration requests and call connections from a mobile subscriber (MS) or mobile device 110 to either a cellular telephone network or to an IP-based wireless network.

The example cellular telephone network includes one or more base transceiver stations (BTS) 120 that are configured to accept cellular communications 112 from mobile device 110. The base transceiver stations are connected to a base station controller/radio network controller (BSC/RNC) 176 via a private network 130. The private network 130 can include a variety of connections such as T1 lines, a wide area network (WAN), a local area network (LAN), various network switches, and other similar components. BSC/RNC 176 controls network communication traffic to the carrier network 190, where all communications are managed. An example carrier network 190 includes a mobile switching center (MSC) 192, which is configured to control data/call flows, perform load balancing, as well as other functions. A variety of system databases are also accessed in the carrier network such as, e.g., an operation support subsystem (OSS) database 194, a business support system (BSS) database 196, and a home location register (HLR) database 198, for billing, call logging, etc.

The example IP-based wireless network (in this case a UMA network) includes one or more access points (APs) 140 that can accept IP communications 114 from mobile device 110. An access point can be configured as part of a wireless network in one or more locations such as a public network 142, a home network 144, or a private business network 146. Each access point is coupled to an Internet Protocol (IP) network 150 through a broadband connection. IP packets that carry communications (data, voice, SMS, etc.) are routed from the access points to a security gateway (SGW) 171 through the IP network 150. The security gateway controls access to the network controller (in this case, a UMA Network Controller (UNC)) 166, which communicates with a database 168 for logging and accessing various data associated with communications. The network controller 166 is also configured to manage access with the carrier network 190 in a similar manner to that performed by the BSC/RNC 176.

Authentication of a request for access by a mobile device over the IP-based network is handled by the security gateway 171, which communicates with an authentication and access authorization (AAA) module 172 as shown in FIG. 1A. Challenges and responses to requests for access by the mobile device are communicated between home location register (HLR) database 198 and the AAA module 172. When authorization is granted, the security gateway 171 communicates the assignment of an IP address to the mobile device 110 that requested access. Once the IP address is passed to the mobile device 110 by the security gateway 171, the public IP address assigned to the device is passed to the network controller 166.

Figure 1B:
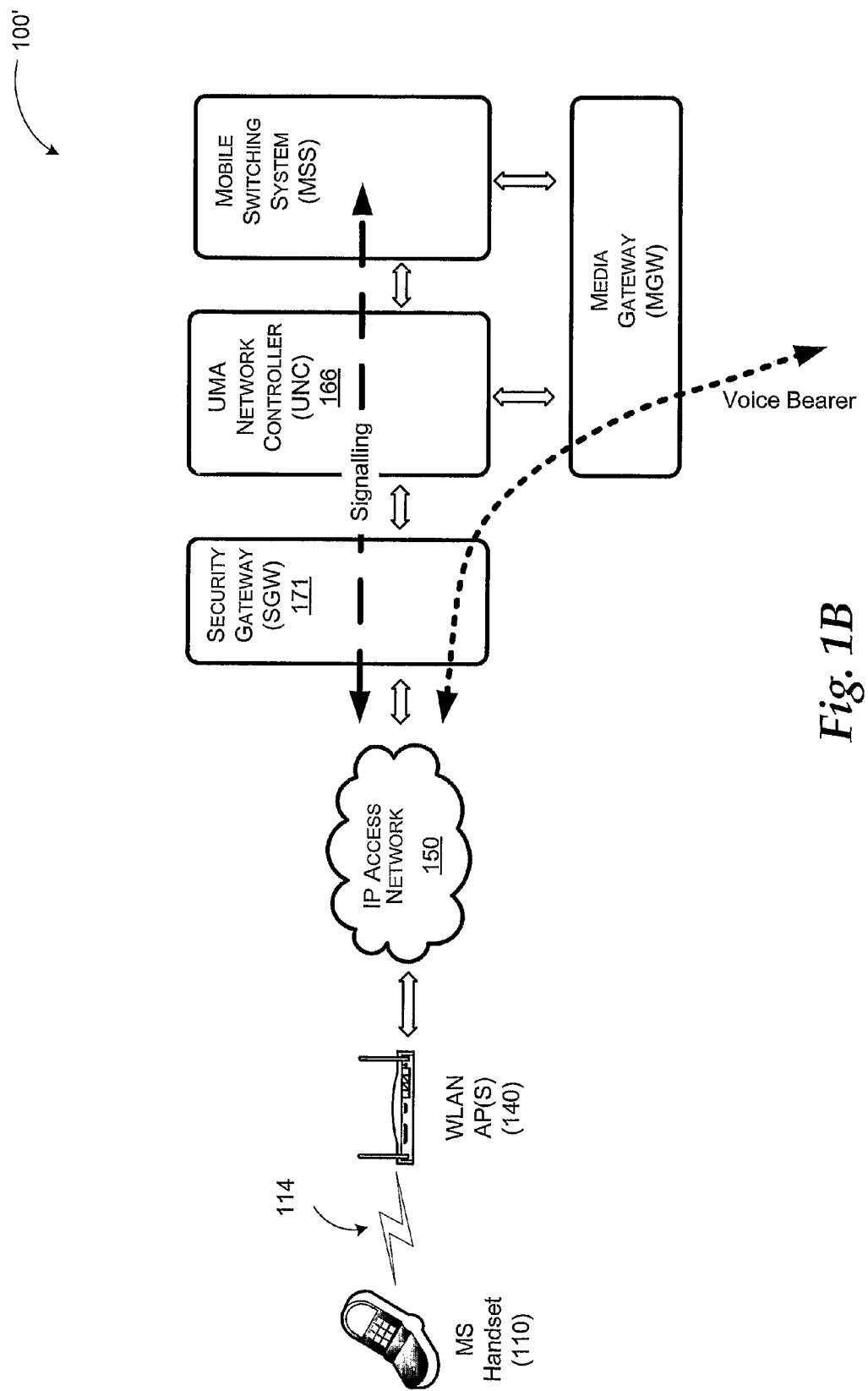
FIG. 1B illustrates another example system that combines a cellular telephone network with an IP-based network (in this case, a UMA network).

FIG. 1B illustrates another example system that combines a cellular telephone network with an IP-based network (in this case, a UMA network). The described system 100' accepts registration requests and call connections from a mobile device 110 to either a cellular telephone network (not shown) or to an IP-based wireless network. The system 100' includes one or more access points (AP) 140 that accept communications 114 from mobile device 110. Each access point is coupled to an IP network 150 through a broadband connection. IP network 150 routes communications (data, voice, SMS, etc.) between the access points and a security gateway (SGW) 171. The security gateway 171 controls access to the network controller 166, which communicates with a database (not shown) for logging and accessing various data associated with communications. Authentication, access, and authorization are handled by SGW 171 via AAA module 172, as previously described.

For the example system 100', the signaling path of an IP-based call is routed through the network controller 166 to a mobile switching system (MSS), while the voice bearer path is routed through the network controller 166 to a media gateway (MGW). The signaling portion of a communication governs various overhead aspects of the communication such as, for example, when the call starts, when the call stops, initiating a telephone ring, etc. The voice bearer portion of the communication contains the actual content (either data or voice information) of the communication. The media gateway controls the content flow between the service provider and the mobile device 110, while the mobile switching system controls the signaling flow (or controls overhead-related flow) between the service provider and the mobile device 110.

Figure 2:
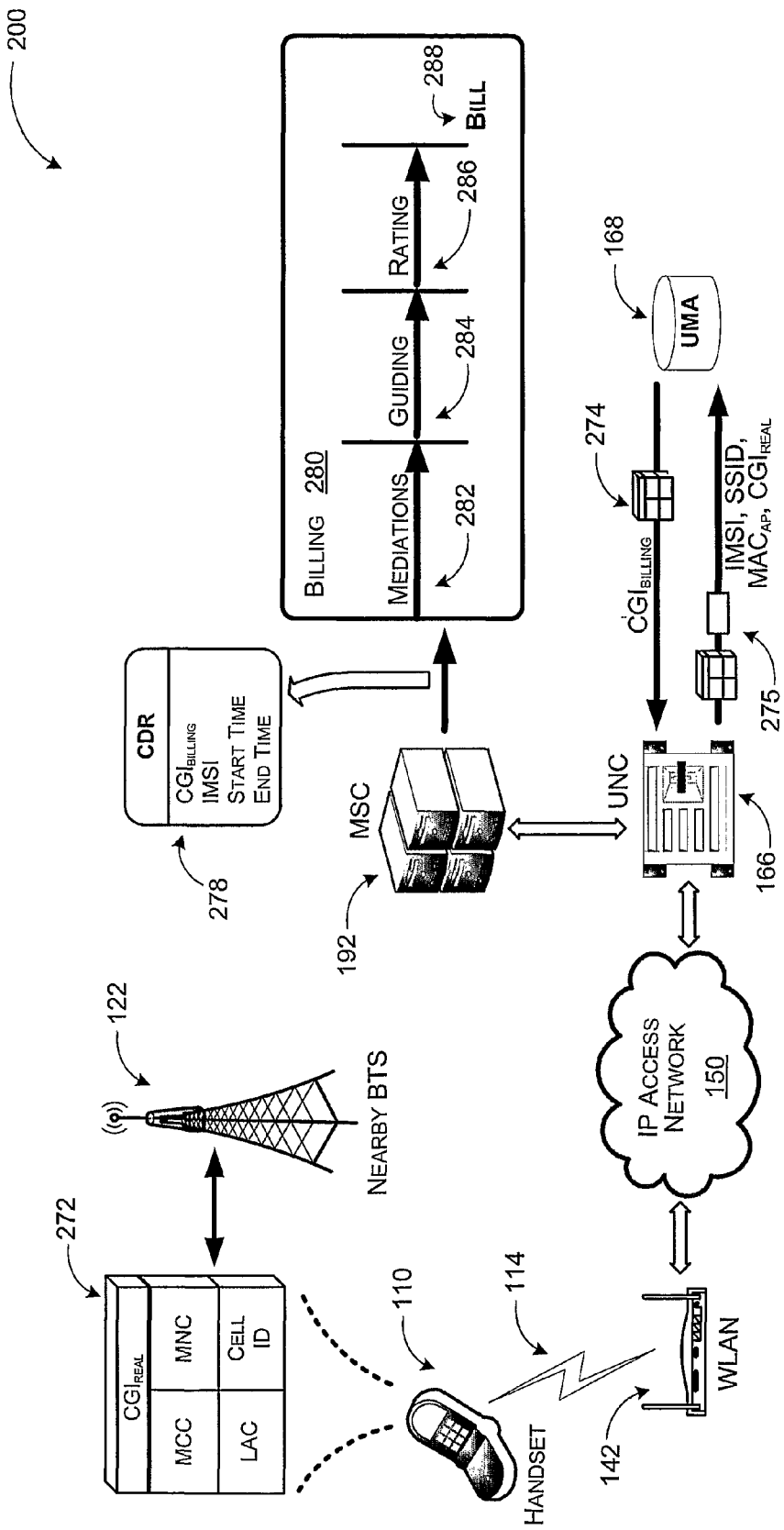
FIG. 2 is a conceptual diagram illustrating an IP-based network system (in this example a UMA network) and billing operations using Call Detail Records (CDR) for billing operations according to one embodiment.

FIG. 2 is a conceptual diagram illustrating an IP-based wireless network system 200 (in this example a UMA network) and billing operations using Call Detail Records (CDR) for billing operations according to one embodiment. Using existing call detail record fields prevents the need to modify MSCs (Mobile Switching Centers) thus limiting the modifications to the billing system. Examples of existing call detail record fields include those record fields defined for 2G and 3G cellular networks in applicable specifications, such as the 3GPP and 3GPP2 specifications. Furthermore, billing system modifications, especially mediations modifications, may be minimized by adding a specific flag. This may be accomplished by populating (i.e., overloading) an existing field of the CDR such as, for example, the MCC (Mobile Country Code) sub field portion of the starting CGI (Cell Global Identifier) with a specific value.

According to some embodiments, the presence of a UMA call detail record may be flagged using an existing call detail record field (e.g., MCC). Using an existing CDR (Call Detail Record) field minimizes the impact to cellular service provider systems involved in billing subscribers.

In principle, a CGI value is the concatenation of MCC (Mobile Country Code)—MNC (Mobile Network Code)—LAC (Location Area Code)—Cell ID. They are used to identify individual GSM transmission cells and the carrier that operates them. These CGI values are reported to a UNC (UMA Network Controller) when a UMA terminal registers to the network. The cellular service provider may use these reported CGI values to determine whether or not UMA should be offered. For example, there maybe some countries where the cellular service provider may not offer "home" based service. In this case, the cellular service provider could choose not to provide service or to redirect the terminal to another UMA or GSM provider. The cellular service provider may further use the reported CGI values to assist in determining the optimum serving UNC for a mobile terminal.

Network 200 has the same basic organization as FIG. 1A and is labeled identically where appropriate. The described system 200 accepts registration requests and call connections from a mobile subscriber (MS) or mobile device 110 to either a cellular telephone network or to an IP-based wireless network.

Mobile device 110 can communicate with a nearby base transceiver station (BTS) 122 when a cellular based communication is initiated. During the call setup for the cellular based communication, a call detail record (272) is initialized with various CGI values. Example CGI values including MCC, MNC, LAC and CELLID are illustrated by $CGI_{REAL}$ 272.

Mobile device 110 also communicates with the IP-based wireless network (in this case a UMA network) 150 through a wireless access point 142. The wireless access point 142 is configured to accept IP communications 114 from mobile device 110 subject to various authentication requirements. IP packets that carry communications (data, voice, SMS, etc.) are routed from the access points to a security gateway (SGW) that controls access to the IP-based network controller (in this case, a UMA Network Controller (UNC) 166), which communicates with a database 168 for logging and accessing various data associated with the communications. The IP packets are routed from the network controller 166 to a mobile switching center (MSC) 192, which is configured to control data/call flows, perform load balancing, as well as other functions.

Upon completion of a call, MSC 192 generates a CDR (Call Detail Record) 278 that is utilized by a billing system 280 for mediation 282, guiding 284, rating 286 and generating bills 288. CDR 278 includes a CGI ($CGI_{BILLING}$) an International Mobile Subscriber Identity (IMSI) ID, a start time associated with the call, and an end time for the call.

$CGI_{BILLING}$ is provided to MSC 192 by UNC 166. Mobile device (110) communicates its IMSI ID to UNC 166 during the initial call setup, along with a CGI ($CGI_{REAL}$), and any other information associated with the wireless network. $CGI_{REAL}$ is a CGI that is associated with the nearby BTS 122, which includes information such as MCC, MNC, LAC and CELL ID. The information associated with the wireless network can include the SSID and the MAC address ($MAC_{AP}$) associated with the wireless access point 142. The UNC uses the various information 275 such as IMSI ID, SSID, $MAC_{AP}$ to access database 168, which returns $CGI_{BILLING}$.

Figure 3:
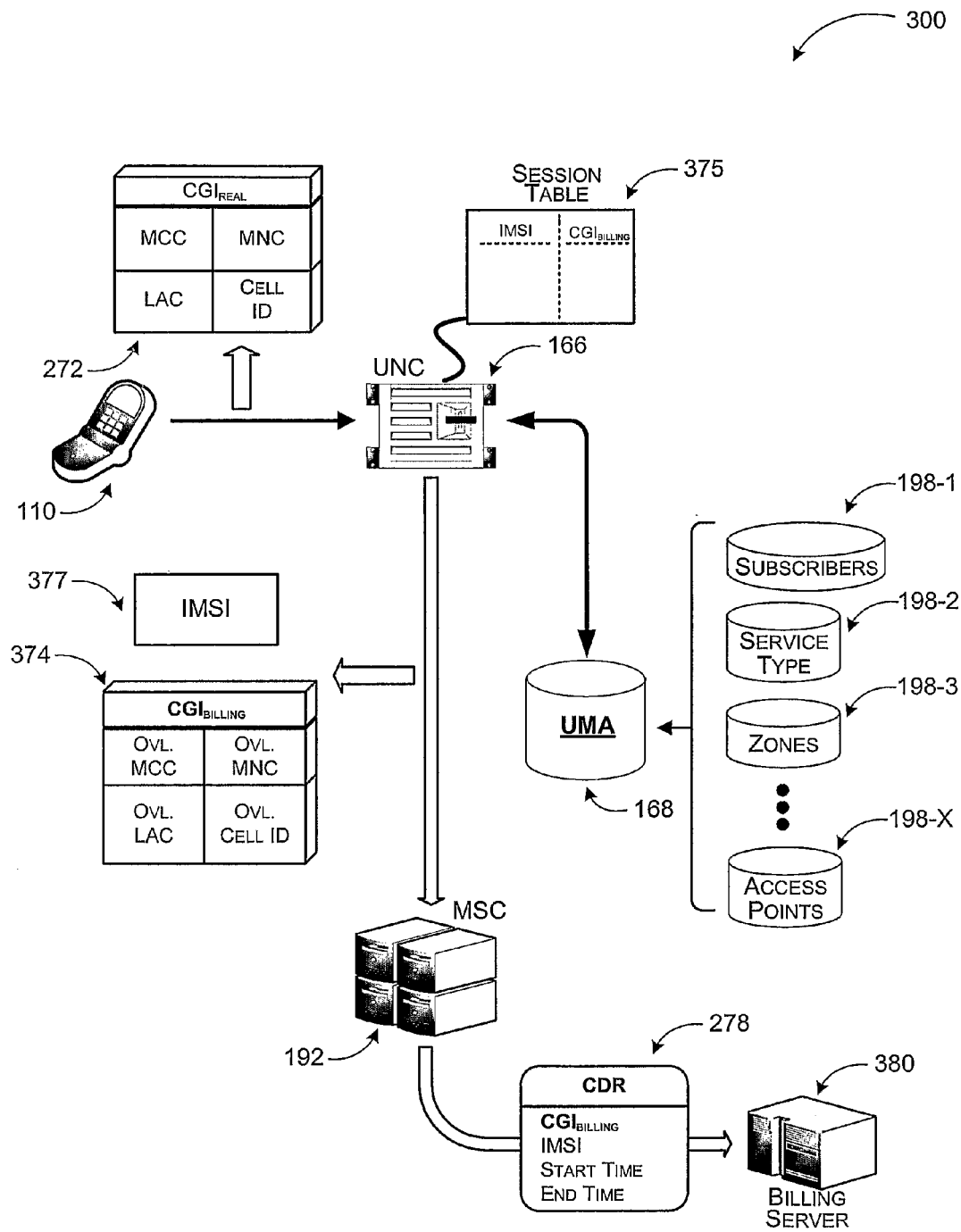
FIG. 3 illustrates a system for overloading of $CGI_{BILLING}$ record based on $CGI_{REAL}$ record and database records to include in Call Detail Records for billing operations.

FIG. 3 illustrates a system 300 for overloading of $CGI_{BILLING}$ record based on $CGI_{REAL}$ record and database records to include in Call Detail Records for billing operations. System 300 has the same basic organization as FIG. 2 and is labeled identically where appropriate.

Network controller 166 can be arranged to manage any number of concurrent communications between mobile devices 110 and MSC 192. Each mobile device 110 includes its own IMSI ID and a $CGI_{BILLING}$ record, which can be managed in a dynamically generated session table 375. After a communication is concluded the overloaded CGI record (e.g., $CGI_{BILLING}$ 374) for the concluded communication is communicated to MSC 192, which provides the relavant call information to a billing server 380 in the form of a CDR 278.

As previously described UNC 166 generates a $CGI_{BILLING}$ record during a call setup by accessing database 168 with $CGI_{REAL}$ (in this example 272). Database 168 may utilize any number of methods to identify the most appropriate CGI value, where database 168 may include fields for subscribers 198-1, service types 198-2, zones 198-3 and access points 198-X. The database fields may in some examples be other databases that are accessed. The subscriber database may include a list of authorized subscribers based upon IMSI ID, or any other appropriate indicia. The service type database may include a list of authorized services for a subscriber, or for a region based on availability. The zones database may include a home service region identifier for a subscriber such as a time zone, or a calling zone region, etc. The access points database may include a list of authorized access points. The various database entries are accessed to generate the $CGI_{BILLING}$ record.

CGI records have a number of record fields that are used to identify various things related to cellular communications. In particular, cellular communications utilize fields such as MCC, MNC, LAC and CELL ID to identify the nearby BTS. Since these fields are not relevant for wireless IP-based communications, these fields can be re-used or overloaded to populate the fields with other information that MSC 192 can use to generate call detail records (CDRs). Overloaded values for the CGI record are illustrated by $CGI_{BILLING}$ record 374.

In a system according to some embodiments:
  The system may provide a database to store GSM transmission network CGIs and information related to those CGI values.
  The CGI database may support partial entries such as MCC, MNC value pairs.
  The CGI database may support wild card ranges of CGI values or partial CGI values.
  The CGI database may support a Visited UNC value specifying the visited UNC to redirect the mobile to.
  The CGI database may support storing a list of Preferred Home Serving UNCs for CGI entries.

Billing Events
  In another system according to some embodiments:
  All unbilled usage may be available for customer care viewing just as GERAN (GSM/Edge Radio Access Network) calls. These records may include UMA indication regardless of if the subscriber has an add-on UMA SOC.
  All billable events available in GERAN may be available over the UMA system.
  Billable events may be consistent between UMA and GERAN.
  A call that starts on the UMA system that hands into GERAN may be considered as if it were on the UMA transport for the entire duration of the call. The opposite (call starts in GERAN and hands into UMA) may also be supported as if the call were on the GSM network for its entirety.
  The UNC may send the billing CGI value derived at URR registration or URR redirect, whichever is the most recent, for inclusion in UMA CDRs.
  If a specific CGI value is not available for the subscriber database, a default value unique to the UMA system may be reported.
  Call detail records coming from the MSC may be maintained unchanged except in CGI related CDR fields.
  All unbilled usage may be made available for web-based viewing just as GERAN calls. These records may include UMA indication only if the subscriber has an add-on UMA SOC.

Rating
  In some systems:
  CGI values may be used to indicate UMA rating in CDRs.
  The LAC component of the CGI may indicate time zone to the billing system. There may be an established mapping of LAC to U.S. time zones. This mapping may exist in engineering systems or COS systems.
  The billing system may support a configurable UMA DEFAULT area definition table that allows for insertion of CGI values and ranges (CellID+Location area) as the definition of the Wi-Fi area. These definitions may mirror the CGIZ values in the UMA Service Zone database.
  The co-ordination as described above may be done so that multiple ranges of CGIs can be distinguished in the billing system for rating purposes.

Figure 4:
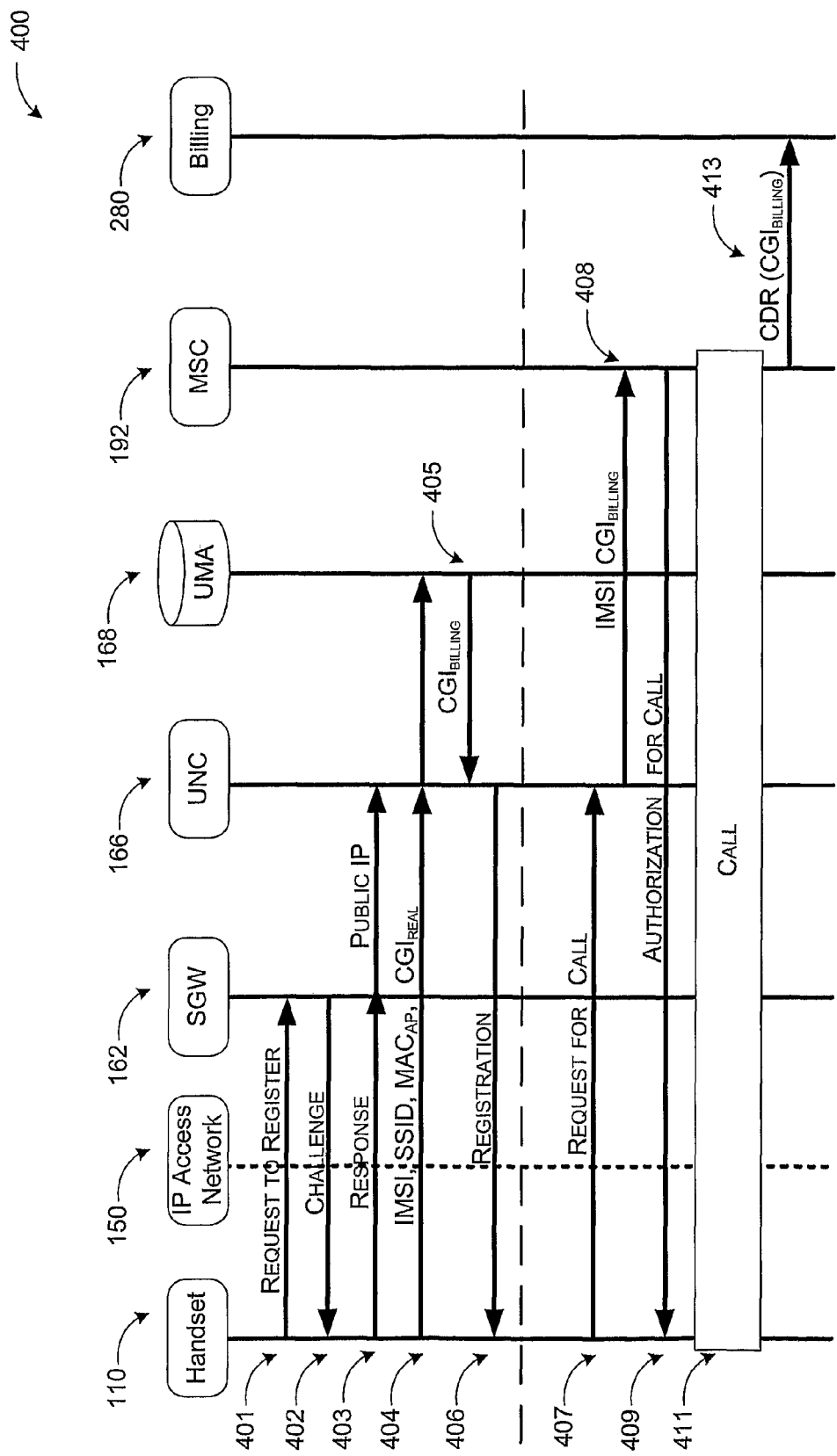
FIG. 4 is a diagram illustrating actions in an IP-based network (in this example a UMA network) for registering handset and facilitating a call from the handset.

FIG. 4 is a diagram 400 illustrating actions in an IP-based network (in this example a UMA network) for registering handset and facilitating a call from the handset 110. The call registration process is illustrated by communication steps 401-406, while the calling process is illustrated by communication steps 407-413.

As shown in FIG. 4, a call is imitated when a handset 110 requests to register with the security gateway (SGW) 162 over the IP access network 150 at step 401. SGW 162 replies with an authentication challenge that is communicated back to the handset 110 at step 402. At step 403, the handset 110 responds to the authentication challenge with a response that is communicated to SGW 162. Also at step 403, SGW 162 communicates a public IP address assigned to the access point for the network to the network controller 166. The handset 110 also communicates the IMSI ID and a CGI record ($CGI_{REAL}$) to the SGW 162. At step 404, the SGW 162 transmits the IMSI ID, $CGI_{REAL}$ along with the SSID and MAC address ($MAC_{AP}$) from the access point in a communication to the network controller 166. Network controller (UNC) 166 communicates with database 168 at step 404, which replies with $CGI_{BILLING}$ at step 405. At step 406, network controller 166 communicates a registration completion to the handset 110.

Once the registration is completed, handset 110 can communicate with network controller 166 to request a call as illustrated by step 407. At step 408, the network controller 166 communicates the IMSI ID and $CGI_{BILLING}$ to MSC 192. MSC 192 authorizes the call at step 409 such that the handset 110 can communicate over a communication channel that is established through MSC 192 at step 411. At step 413, the call is terminated and MSC 192 communicates a CDR that includes the overloaded $CGI_{BILLING}$ information to the billing system 280.

Figure 5:
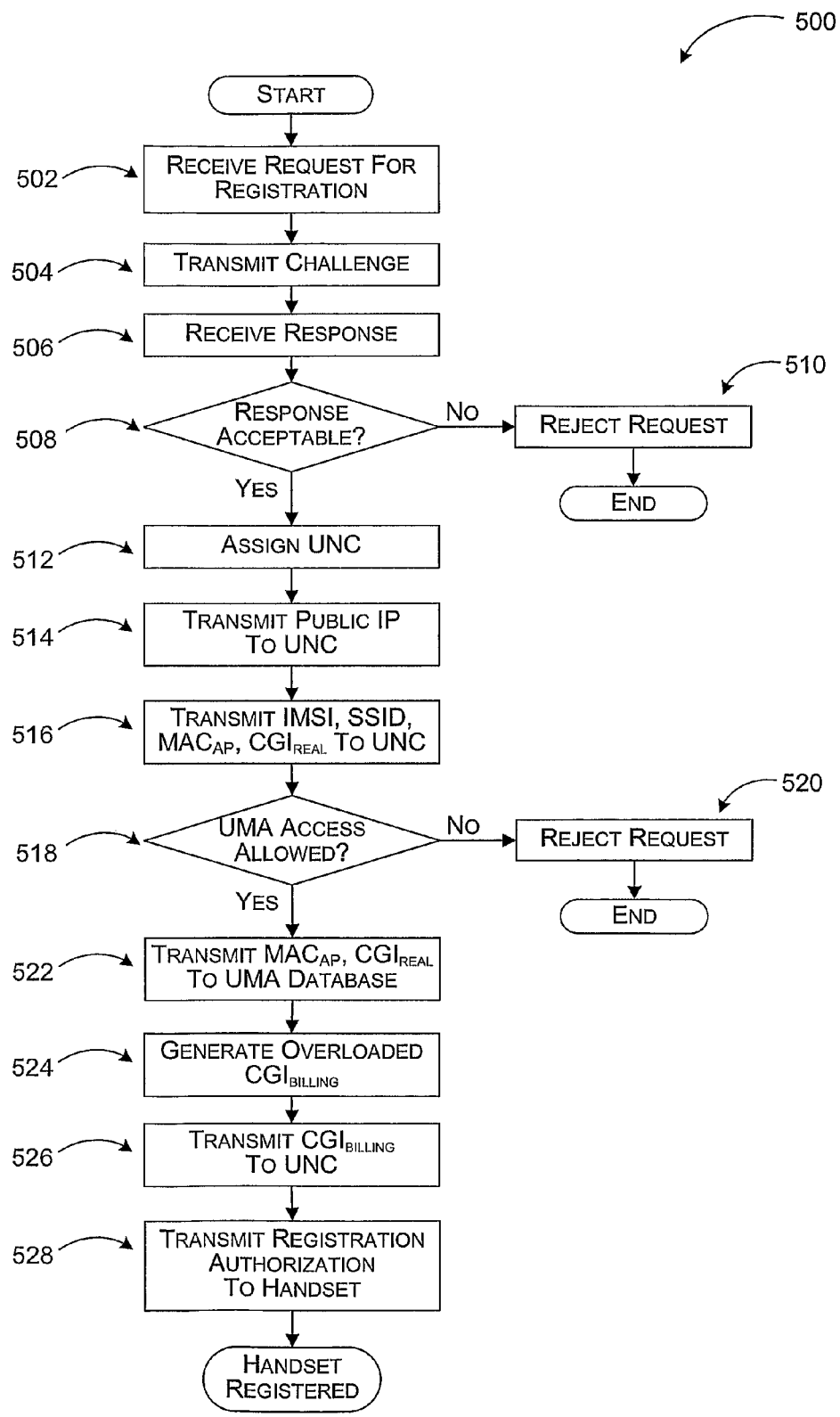
FIG. 5 illustrates a logic flow diagram for a process of registering a handset in an IP-based network, (in this example a UMA network).

FIG. 5 illustrates a logic flow diagram 500 for a process of registering a handset 110 in an IP-based wireless telecommunications network (in this example a UMA network). The registration process, which is similar to that described above for FIG. 4, is illustrated by process steps 502-528.

At step 502 the registration request is received. A challenge is transmitted to the handset 110 at step 504. At step 506 the system receives a response to the challenge from the handset 110. At step 508, the response from the handset is evaluated. Processing continues from step 508 to step 510 when the response in unacceptable, where the request is rejected at step 510. Otherwise, processing continues from step 508 to step 512.

At step 512, a network controller (e.g., a UNC in a UMA network) is assigned to handle the connection. Proceeding to step 514, the public IP address associated with the access point that the handset 110 used to access the network is communicated to the network controller. At step 516 the SSID and MAC address ($MAC_{AP}$) from the access point are communicated to the network controller, along with the IMSI ID and $CGI_{REAL}$ from the handset 110. At step 518 the various information received at the network controller is evaluated to determine if access to the network is granted (e.g., the UMA network). Processing flows from step 518 to step 520 when access is denied, where the request is rejected at step 520. Otherwise, processing continues from step 518 to step 522.

At step 522, $MAC_{AP}$ and $CGI_{REAL}$ are transmitted to the database (e.g., a UMA database) such as in the form of a database query. The database generates $CGI_{BILLING}$ in response to the query at step 524. Proceeding to step 524, the database transmits $CGI_{BILLING}$ to the network controller (e.g., UNC). At step 528, the registration authorization is transmitted to the handset.

Figure 6:
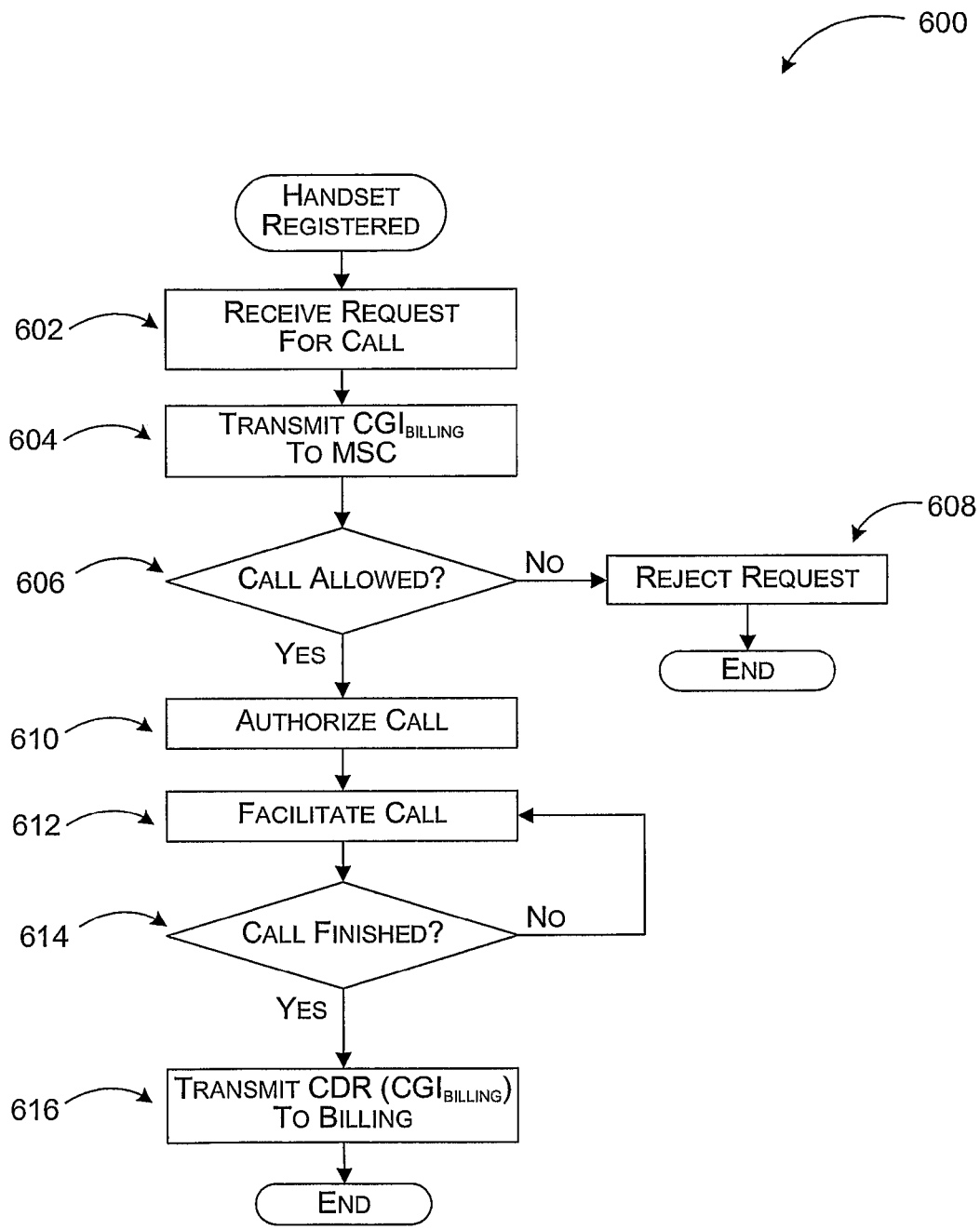
FIG. 6 illustrates a logic flow diagram for a process of facilitating and billing a call from a handset in an IP-based network (in this example a UMA network).

FIG. 6 illustrates a logic flow diagram 600 for a process of facilitating and billing a call from a handset 110 in an IP-based network (in this example a UMA network). The calling process, which is similar to that described above for FIG. 4, is illustrated by process steps 602-616.

At step 602 the call request is received by the network controller (e.g., UNC 166). Proceeding to step 604, $CGI_{BILLING}$ is transmitted from the network controller to the MSC (e.g., MSC 192). Processing continues from step 604 to step 606 where the information is evaluated to determine if the call is permitted. Processing flows from step 606 to step 608 when the call is rejected, where a call reject is generated at step 608. Otherwise, processing continues from step 606 to step 610.

At step 610, the call is authorized. Flowing to step 612, the call is facilitated such as by transferring IP packets for the call through the wireless IP network to the MSC. At step 614, the call is continually monitored to determine if the call has been completed (terminated) such as by a call hang-up or via an inadvertently dropped call. Processing continues to step 612 when the call is ongoing, or to step 616 when the call has been completed. At step 616 the CDR is transmitted to the billing system, where the CDR includes the information from the overloaded CGI record ($CGI_{BILLING}$).

The present disclosure is not limited to the above-described environment. Many other configurations of computing devices, communications, applications, and distribution systems may be employed to implement a system for identifying UMA call detail records using existing call detail record fields.

According to some embodiments, a computer-implemented method for facilitating Call Detail Record (CDR) billing in a converged wireless system and an Internet telephony system may begin with receiving a registration request over the Internet telephony system from a handset that is capable of using the wireless system and the Internet telephony system and is identified by a wireless identifier. An Internet telephony cell identity is selected with a gateway node referenced by the wireless identifier after the registration request is received.

The method further includes modifying at least one existing radio cell identity field with the Internet telephony cell identity such that the modified radio cell identity field corresponds to an Internet telephony call and identifying a call request from the handset over the Internet telephony system. The modified radio cell identity field is then communicated to a switch for the identified call request. Successful registration may also be communicated to the handset.

The Internet telephony cell identity is selected by providing a radio cell identity from the handset to an Internet telephony system database, and receiving the Internet telephony cell identity from the Internet telephony system database.

The method also includes facilitating the Internet telephony system call for the handset in response to the Internet telephony system call request, and communicating a CDR that includes the Internet telephony cell identity from the switch to a billing system upon completion of the Internet telephony system call.

The Internet telephony call identity may include at least one of: a modified Mobile Country Code (MCC) field, a modified Mobile Network Code (MNC) field, a modified Location Area Code (LAC) field, and a modified Cell ID field. The MCC field may be populated with a value indicating the Internet telephony system call request is made over the Internet telephony system.

Furthermore, the LAC and Cell ID fields may be populated with a value pair that identifies the Internet telephony system call request as being for one of: an in-country call, an out-of-country call, a call made near a tower belonging to the wireless system, and a call made near a tower belonging to another wireless system.

In another embodiment, a gateway node may be assigned based on a public IP address associated with the Internet telephony system. The Internet telephony system database may include at least one of: a subscriber database, a service type database, a zones database, and an access points database.

Where a security node is employed, the security node may be configured to authenticate the handset by a security gateway prior to registration, communicate a public IP address associated with the access network to the gateway node as part of the authentication, and assign the gateway node based on the public IP address.

The switch may be arranged to communicate a start time and an end time associated with the Internet telephony system call to the billing system upon completion of the Internet telephony system call.

Many of the examples described above reference the CGI record as the selected field that is used for overloading in the CDR. The CGI record is merely one example field in the CDR, and any other appropriate field may be selected for overloading without departing from the scope of the present disclosure.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computer-implemented method for facilitating Call Detail Record (CDR) billing in a converged cellular system and an IP-based wireless system, the method comprising:
    receiving a registration request over the IP-based wireless system from a handset that is capable of using the cellular system and the IP-based wireless system and is identified by a wireless identifier;
    selecting an IP-based wireless cell identity with a gateway node referenced by the wireless identifier after the registration request is received;
    overloading at least one existing field from a cellular call detail record with the IP-based wireless cell identity such that the overloaded cellular call detail record field corresponds to an IP-based wireless call;
    identifying a call request from the handset over the IP-based wireless system; and
    communicating the overloaded cellular call detail record to a switch for the identified call request,
        wherein the overloaded cellular call detail record reflects, at least in part, a handover from the IP-based wireless system to the cellular system or from the cellular system to the IP-based wireless system.

2. The computer-implemented method of claim 1, further comprising communicating successful registration to the handset.

3. The computer-implemented method of claim 1, wherein selecting the IP-based wireless cell identity includes:

providing a radio cell identity from the handset to an IP-based wireless system database; and receiving the IP-based wireless cell identity from the IP-based wireless system database.

4. The computer-implemented method of claim 1, further comprising:

facilitating the IP-based wireless system call for the handset in response to the IP-based wireless system call request; and communicating the overloaded cellular call detail record that includes the IP-based wireless cell identity from the switch to a billing system upon completion of the IP-based wireless system call.

5. The computer-implemented method of claim 1, wherein the IP-based wireless cell identity includes at least one of: a modified Mobile Country Code (MCC) field, a modified Mobile Network Code (MNC) field, a modified Location Area Code (LAC) field, and a modified Cell ID field.

6. The computer-implemented method of claim 5, wherein the MCC field is populated with a value indicating the IP-based wireless system call request is made over the IP-based wireless system.

7. The computer-implemented method of claim 5, wherein the LAC and Cell ID fields are populated with a value pair that identifies the IP-based wireless system call request as being for one of: an in-country call, an out-of-country call, a call made near a tower belonging to the cellular system, and a call made near a tower belonging to another cellular system.

8. The computer-implemented method of claim 1, further comprising assigning the gateway node based on a public IP address associated with the IPbased wireless system.

9. A gateway node having computer-readable instructions for facilitating Call Detail Record (CDR) billing in a converged cellular system and an IP-based wireless system, the instructions comprising:

receiving a registration request associated with a handset over an IP-based wireless system, wherein the registration request includes identification information comprising at least one of: a wireless identity, a radio cell identity, an SSID, and a MAC address;

accessing an IP-based wireless system database with the identification information;

receiving an IP-based wireless cell identity from the IP-based wireless system database;

overloading at least one existing field from a cellular call detail record with the IP-based wireless cell identity such that the overloaded cellular call detail record field corresponds to an IP-based wireless system call, wherein the overloaded cellular call detail record reflects, at least in part, a billing event;

identifying a call request from the handset over the IP-based wireless system; and communicating the overloaded cellular call detail record to a switch for the identified call request.

10. The gateway node of claim 9, wherein the instructions further include:

receiving a public IP address associated with the IP-based wireless system from a security node prior to receiving the request for registration; and communicating successful registration to the handset.

11. The gateway node of claim 9, wherein the IP-based wireless cell identity includes at least one of: a modified Mobile Country Code (MCC) field, a modified Mobile Network Code (MNC) field, a Location Area Code (LAC) field, and a Cell ID field.

12. The gateway node of claim 11, wherein the MCC field is populated with a value indicating the IP-based wireless system call is made via the IP-based wireless system; and the LAC and Cell ID fields are populated with a value pair that identifies the IP-based wireless system call as being one of: an in-country call, an out-of-country call, a call made near a tower belonging to the cellular system, and a call made near a tower belonging to another cellular system.

13. A system for facilitating Call Detail Record (CDR) billing in a converged cellular system and an IP-based wireless system, the system comprising:

a gateway node that is configured to:

receive a registration request from a handset using an IP-based wireless system, wherein the request includes identification information comprising at least one of a wireless identity, a radio cell identity, an SSID, and a MAC address;

access an IP-based wireless system database with the identification information;

receive an IP-based wireless cell identity from the IP-based wireless system database;

overwrite at least one existing field from a cellular call detail record with the IP-based wireless cell identity such that the overwritten cellular call detail record field corresponds to an IP-based wireless system call, wherein overwritten cellular call detail record reflects, at least in part, a billing event; and identify a call request from the handset over the IP-based wireless system; and a switch that is configured to:

receive the overwritten cellular call detail record from the gateway node for the identified call request;

facilitate an IP-based wireless system call from the handset in response to the call request; and communicate the IP-based wireless cell identity to a billing system upon completion of the IP-based wireless system call.

14. The system of claim 13, wherein the IP-based wireless system database is configured to determine the IP-based wireless cell identity based on the received identification information, wherein the IP-based wireless system database includes at least one of: a subscriber database, a service type database, a zones database, and an access points database.

15. The system of claim 13, further comprising a security node that is configured to:

authenticate the handset by a security gateway prior to registration;

communicate a public IP address associated with the access network to the gateway node as part of the authentication; and assigne the gateway node based on the public IP address.

16. The system of claim 13, wherein the gateway node is further configured to overwrite the existing call detail record fields such that an MCC field is overwrite with a value indicating the IP-based wireless system call is made via the access network.

17. The system of claim 13, wherein the gateway node is further configured to overwrite the existing call detail record fields such that LAC and Cell ID fields are populated with a value pair that identifies the IP-based wireless system call as being one of: an out-of-country call, a call made near a tower belonging to the cellular system, and a call made near a tower belonging to another cellular system.

18. The system of claim 13, wherein the switch is further configured to communicate a start time and an end time associated with the IP-based wireless system call to the billing system upon completion of the IP-based wireless system call.

19. The system of claim 13, further comprising a radio cell identity database configured to store information associated with the handset when it uses a cellular system component of the converged systems.

20. A computer-implemented method for facilitating Call Detail Record (CDR) billing in an Unlicensed Mobile Access (UMA) network, the method comprising:
  receiving a registration request from a UMA capable handset that is identified by an International Mobile Subscriber Identity (IMSI) ID, wherein the UMA capable handset is using an access network;
  selecting a Cell Global Identification ($CGI_{BILLING}$) ID with a UMA Network Controller (UNC) referenced by the IMSI ID Mier the registration request is received;
  overloading at least one existing CGI field with the $CGI_{BILLING}$ ID such that the overloaded CGI field corresponds to a UMA call;
  identifying a call request from the UMA capable handset over the access network; and
  communicating the overloaded CGI field to a Mobile Switching Center (MSC) for the identified call request.

21. The computer-implemented method of claim 20, further comprising communicating successful registration to the UMA capable handset.

22. The computer-implemented method of claim 20, wherein selecting the $CGI_{BILLING}$ ID includes:
  providing a $CGI_{REAL}$ ID from the UMA capable handset to a UMA database; and
  receiving the $CGI_{BILLING}$ ID from the UMA database.

23. The computer-implemented method of claim 20, further comprising:
  facilitating the UMA call for the UMA capable handset in response to the UMA call request; and
  communicating a CDR that includes the $CGI_{BILLING}$ ID from the MSC to a billing system upon completion of the UMA call.

24. The computer-implemented method of claim 20, wherein the $CGI_{BILLING}$ ID includes at least one of: a modified Mobile Country Code (MCC) field, a modified Mobile Network Code (MNC) field, a Location Area Code (LAC) field, and a Cell ID field.

25. The computer-implemented method of claim 24, wherein the MCC field is populated with a value indicating the UMA call request is made over the access network.

26. The computer-implemented method of claim 24, wherein the LAC and Cell ID fields are populated with a value pair that identifies the UMA call request as being for one of: an in-country call, an out-of-country call, a call made near a tower belonging to the UMA network, and a call made near a tower belonging to another cellular network.

27. An Unlicensed Mobile Access Network Controller (UNC) having computer-readable instructions for facilitating Call Detail Record (CDR) billing in an Unlicensed Mobile Access (UMA) network, the instructions comprising:
  receiving a registration request associated with a UMA capable handset over an access network, wherein the registration request includes identification information comprising at least one of: an IMSI ID, a $CGI_{REAL}$ ID, an SSID, and a MAC address;
  accessing a UMA database with the identification information;
  receiving a $CGI_{BILLING}$ ID from the UMA database;
  overloading at least one existing CGI field with the $CGI_{BILLING}$ ID such that the overloaded CGI field corresponds to a UMA call;
  identifying a call request from the UMA capable handset over the access network; and
  communicating the overloaded CGI field to a Mobile Switching Center (MSC) for the identified call request.

28. The UNC of claim 27, wherein the instructions further include:
  receiving a public IP address associated with the access network from a Security Gateway prior to receiving the request for registration; and
  communicating successful registration to the UMA capable handset.

29. The UNC of claim 27, wherein the $CGI_{BILLING}$ ID includes at least one of: a modified Mobile Country Code (MCC) field, a modified Mobile Network Code (MNC) field, a Location Area Code (LAC) field, and a Cell ID field.

30. The UNC of claim 29, wherein the MCC field is populated with a value indicating the UMA call is made via the access network, and the LAC and Cell ID fields are populated with a value pair that identifies the UMA call as being one of: an in-country call, an out-of-country call, a call made near a tower belonging to the UMA network, and a call made near a tower belonging to another cellular network.

31. A system for facilitating Call Detail Record (CDR) billing in an Unlicensed Mobile Access (UMA) network, the system comprising:
  a UNC that is configured to:
    receive a registration request from a UMA capable handset using an access network, wherein the request includes identification information comprising at least one of: an IMSI ID, a $CGI_{REAL}$ ID, an SSID, and a MAC address;
    access a UMA database with the identification information;
    receive a $CGI_{BILLING}$ ID from the UMA database;
    overload at least one existing CGI field with the $CGI_{BILLING}$ ID such that the overloaded CGI field corresponds to a UMA call; and
    identify a call request from the UMA capable handset over the access network; and
  an MSC that is configured to:
    receive the overloaded CGI field from the UNC for the identified call request;
    facilitate a UMA call from the UMA capable handset in response to the call request; and
    communicate the $CGI_{BILLING}$ ID to a billing system upon completion of the UMA call.

32. The system of claim 31, wherein the UMA database is configured to determine the $CGI_{BILLING}$ ID based on the received identification information, wherein the UMA database includes at least one of: a subscriber database, a service type database, a zones database, and an access points database.

33. The system of claim 31, further comprising a Security Gateway that is configured to:
  authenticate the UMA capable handset by a Security Gateway prior to registration;
  communicate a public IP address associated with the access network to the UNC as part of the authentication; and
  assign the UNC based on the public IP address.

34. The system of claim 31, wherein the UNC is further configured to overload the existing CGI fields such that an MCC field is populated with a value indicating the UMA call is made via the access network; an MNC field is populated with a value corresponding to a rating plan; and LAC and Cell ID fields are populated with a value pair that identifies the UMA call as being one of: an out-ofcountry call, a call made near a tower belonging to the UMA network, and a call made near a tower belonging to another cellular network.

35. The system of claim 31, wherein the MSC is further configured to communicate a start time and an end time associated with the UMA call to the billing system upon completion of the UMA call.

36. The system of claim 31, further comprising a CGI database configured to store information associated with the UMA capable handset when it uses a cellular network component of the UMA network.

* * * * *